United States Patent [19]
Masuda et al.

[11] Patent Number: 5,324,908
[45] Date of Patent: Jun. 28, 1994

[54] METHOD OF CANCELING A SHORT CIRCUIT IN A WIRE CUT ELECTRIC DISCHARGE MACHINE

[75] Inventors: Teruo Masuda; Yuji Tsuboguchi, both of Minamitsuru, Japan

[73] Assignee: Fanuc Ltd., Yamanashi, Japan

[21] Appl. No.: 50,043

[22] PCT Filed: Sep. 11, 1992

[86] PCT No.: PCT/JP92/01170
§ 371 Date: Apr. 28, 1993
§ 102(e) Date: Apr. 28, 1993

[87] PCT Pub. No.: WO93/05916
PCT Pub. Date: Apr. 1, 1993

[30] Foreign Application Priority Data

Sep. 19, 1991 [JP] Japan .................. 3-239705

[51] Int. Cl.$^5$ ............................................. B23H 7/06
[52] U.S. Cl. ........................... 219/69.12; 219/69.16; 219/69.17; 219/69.19
[58] Field of Search ............ 219/69.12, 69.19, 69.17, 219/69.13, 69.16

[56] References Cited

U.S. PATENT DOCUMENTS

| | | | |
|---|---|---|---|
| 3,581,045 | 5/1971 | Panschow | 219/69.12 |
| 3,731,044 | 5/1973 | Ullmann et al. | 219/69.12 |
| 4,733,040 | 3/1988 | Pelloni et al. | 219/69.17 |
| 4,798,929 | 1/1989 | Itoh | 219/69.12 |
| 4,939,334 | 7/1990 | Gruber et al. | 219/69.16 |

FOREIGN PATENT DOCUMENTS

| | | | |
|---|---|---|---|
| 56-39830 | 4/1981 | Japan | 219/69.12 |
| 56-56349 | 5/1981 | Japan | 219/69.12 |
| 60-26650 | 6/1985 | Japan . | |
| 62-287920 | 12/1987 | Japan . | |
| 3-32523 | 2/1991 | Japan | 219/69.12 |
| 3-117520 | 5/1991 | Japan | 219/69.13 |

Primary Examiner—Geoffrey S. Evans
Attorney, Agent, or Firm—Staas & Halsey

[57] ABSTRACT

A method of canceling a short circuit in a wire cut electric discharge machine, capable of speedily and surely canceling the short circuit generated in not only the wire advancing direction but also the perpendicular direction to the advancing one. When the short circuit is detected, the wire is reversed by determined distance $L_0$, and if the short circuit is not canceled at that time, it is determined that the short circuit occurs in the perpendicular direction to the wire advancing one sequentially, machining profiles and the wire position are determined so that the optimum reversible control can be performed, thus the reversing direction and distance of the wire being determined. Further, the optimum reversible control is carried out on the basis of the determined reversing direction and distance, and the wire is returned to the position where the short circuit is initially detected if the cancellation of the short circuit is detected, thus the electric discharge machining being restarted.

8 Claims, 10 Drawing Sheets

METHOD OF CANCELING A SHORT CIRCUIT IN A WIRE CUT ELECTRIC DISCHARGE MACHINE

BACKGROUND OF THE INVENTION

1. Field of the Invention

The present invention relates to a method of canceling a short circuit in a wire cut electric discharge machine, which cancels the short circuit generated between the wire and a workpiece during the electric discharge machining, and in particular, to a method capable of canceling a short circuit generated in the perpendicular direction to the wire advancing direction.

2. Description of the Related Art

The wire cut electric discharge machine generates a pulse discharge in a space between the wire and workpiece. Part of the workpiece is thereby melted. Then, the melted part is blown off by means of the machining liquid from a nozzle, and this operation is continuously carried out. Thus the workpiece is formed into a desired shape. However, during the wire cut electric discharge machining, if a short circuit is generated in a space between the wire and workpiece, the pulse is not discharged. For this reason, the machining is interrupted.

FIG. 9 is a view showing a state between the wire and workpiece during the discharge machining; FIG. (A) shows a normal state, and FIG. (B) shows a short-circuited state. As illustrated in FIG. 9 (A), the wire 20 is supported by means of the upper and lower guides 7 and 10, and a space with a very short distance $\Delta$ is kept between the wire 20 and workpiece 6 by the discharge. Moreover, repulsive force by the discharge machining is generated in the reverse direction relative to the advancing direction 21 of the wire 20. Therefore, deflection of the wire 20 occurs in the center portion 20A of the workpiece thickness. Thus, the discharge machining is carried out under such a state. On the contrary, as illustrated in FIG. 9 (B), once the workpiece 6 and the wire 20 come into contact with each other and a short circuit occurs there, the repulsive force by the discharge machining decreases, while the deflection is gone out of the wire. For this reason, the contact state of the workpiece 6 and the wire 20 is maintained, so that the machining can not be continued. In view of this point, if such a short circuit is detected, the wire is once reversed along the machined path therefrom, and if the cancellation of the short circuit is detected during the reversing operation of the wire, the wire is again returned to the initial short-circuited spot, thus the machining is restarted. Such a method of canceling the short circuit mentioned above is very effective in a short circuit generated in the wire advancing direction.

However, the short circuit is not necessarily generated in the wire advancing direction; for example, in the finish machining, the short circuit may occur in the perpendicular direction to the wire advancing one. In this case, the method of canceling the short circuit mentioned above can not cancel the short circuit between the wire and the workpiece.

FIG. 10 is a view showing a state between the wire and workpiece in the finish machining. In the figure, the finishing allowance 6A of the workpiece 6 is ground by the discharge generated between the wire 20 and the workpiece 6, thus being subjected to the finish machining. In the case of such a finish machining, the offset direction 22 is ordinarily an open surface, so that repulsive force is applied in the oblique direction as shown by an arrow 23 to the advancing direction 21 of the wire 20. For this reason, the wire 20 receives repulsive force of not only the reverse direction 24 to the advancing direction 21 but also the perpendicular direction 25 to the same. As a consequence, deflection of the wire 20 occurs in the perpendicular direction 25. Accordingly, the short circuit is generated in not only the wire advancing direction 21 but also the reverse direction relative to the perpendicular direction.

The short circuit generated in the advancing direction is effectively canceled by the foregoing method of canceling a short circuit, in which the wire is reversed along the path previously machined, but it is impossible to cancel the short circuit generated in the perpendicular direction. In the case where the short circuit is not canceled, the information is given to the operator by an alarm. However, the operator is required to once interrupt the automatic operation pursuant to the alarm, and to move the wire by manual operation in order to cancel the short circuit. For this reason, there are problems that it is troublesome to cancel the short circuit, and impossible to perform perfectly unmanned operations during rough to finish machining.

SUMMARY OF THE INVENTION

The present invention has been made in view of the above circumstances. Therefore, an object of the present invention is to provide a method of canceling a short circuit in a wire cut electric discharge machine, capable of speedily and surely canceling the short circuit generated in not only the wire advancing direction but also the perpendicular direction to the same.

Further, another object of the present invention is to provide a method of canceling a short circuit in a wire cut electric discharge machine, capable of performing perfectly unmanned operation during rough to finish machining.

To solve the above problems, according to the present invention, there is provided a method of canceling a short circuit in a wire cut electric discharge machine, which cancels a short circuit generated between a wire and a workpiece in an electric discharge machining, comprising the steps of: reversing the wire along a path previously machined by a determined distance when the short circuit is detected; carrying out a reversible control of the wire pursuant to the reversing direction and distance determined on the basis of machining profiles and the wire position at the time the wire was reversed by the determined distance; and advancing the wire along the path through which the wire is moved by the reversible control and the path previously machined and returning the wire to the position where the short circuit is initially detected after the short circuit is canceled by means of the reversible control, thus the machining being continued.

When the short circuit is detected, the wire is reversed along the machined path by the determined distance. If the short circuit is not yet canceled at the time the wire was reversed with the determined distance, the reversing direction and distance are determined on the basis of the wire position and machining profiles of the workpiece, and the reversible control of the wire is carried out on the basis of the determined reversing direction and distance. For example, the reversing direction and distance are determined in accordance with the situation whether or not the wire is placed on the corner portion of machining profiles, and the reversing direction of the wire is directed in the direction in which the wire is apart from the workpiece. Accordingly, it is possible to cancel the short circuit generated in not only the wire advancing direction but also the perpendicular direction to the same. Further, when the short circuit is canceled by the reversible control, the wire is conversely advanced along the path which has previously reversed from the position where the short circuit is detected to the position where it is canceled, and is returned to the position where the short circuit was initially detected, thus the machining being again continued.

DESCRIPTION OF THE RELATED ART

One embodiment of the present invention will be described with reference to the drawings below.

Figure 2:
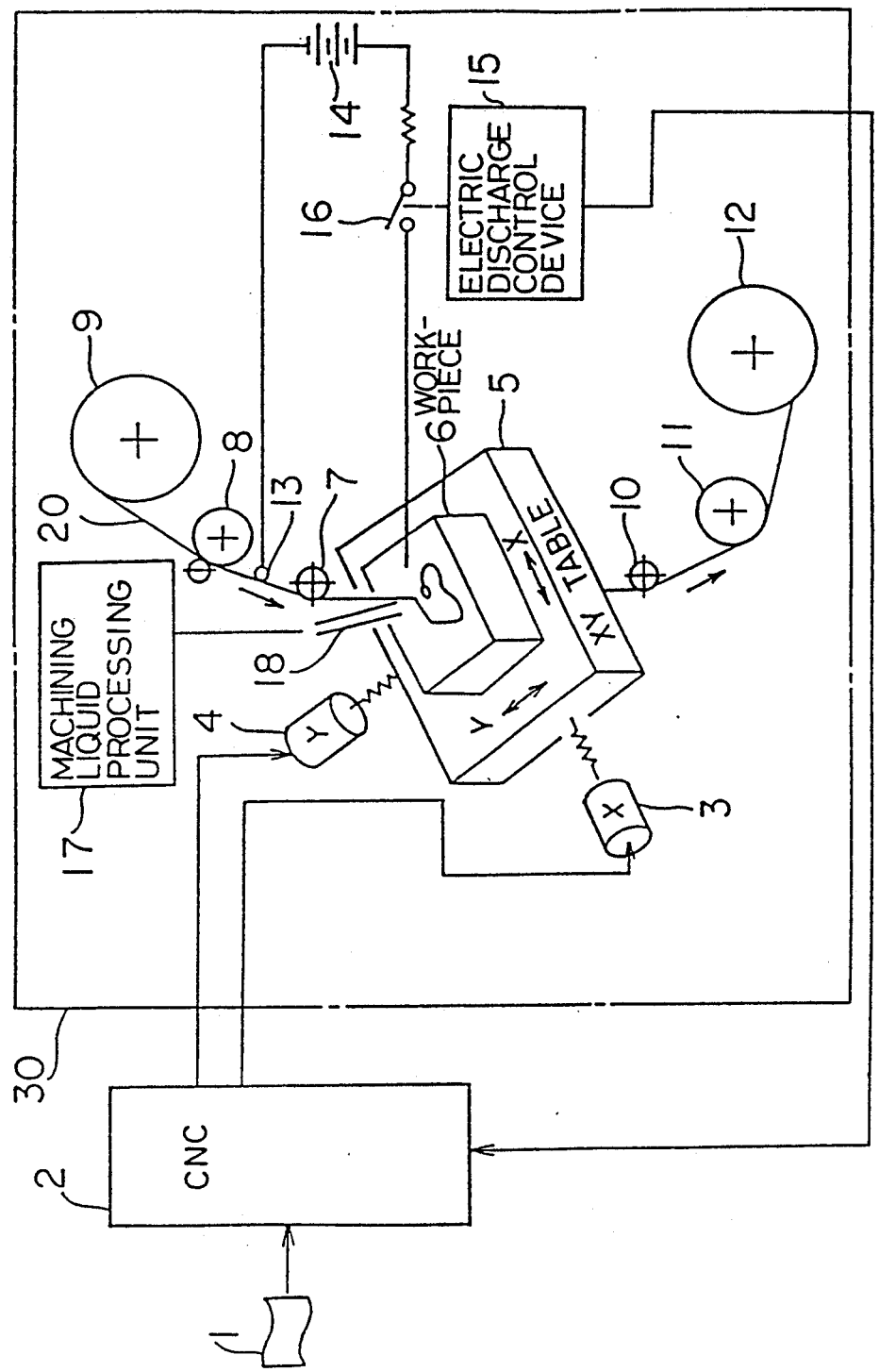
FIG. 2 is a view schematically showing the configuration of the wire cut electric discharge machine applied in the present invention.

FIG. 2 is a block view schematically showing a configuration of a wire cut electric discharge machine applied in the present invention. In the figure, the wire cut electric discharge machine comprises a numerical control unit (referred to as CNC) 2 and an electric discharge machine 30. A machining command tape 1 is a tape in which machining programs are punched. The CNC 2 reads the machining programs from the machining command tape 1 and decodes them, thereby executing a control for the whole of the machine 30 such as a driving of servo motors 3 and 4, movement of an X-Y table 5, or the like.

The X-Y table 5 can move in the X and Y axes directions perpendicular to each other by means of the servo motors 3 and 4. Further, on the X-Y table 5, a workpiece 6 made of a conductive material is placed. An upper wire guide 7 for holding a wire 20 is located at an upper portion of the workpiece 6, and a lower wire guide 10 is located at a lower portion of the X-Y table 5. These upper and lower wire guides 7 and 10 serve to accurately position the workpiece 6 on the table for machining. The wire 20 is continuously fed from a feed reel 9, and supplied to the workpiece 6 through a brake 8 and the upper wire guide 7. Then, the wire 20 passing through the workpiece 6 is passed through the X-Y table 5, and is, thereafter, received in a wire take-up reel 12 through the lower wire guide 10 and a wire feeding roller 11.

A voltage for an electric discharge machining from a power source 14 to the wire 20 is supplied by a feeder 13 interposed between the upper wire guide 7 and the brake 8. While, the other end of the power source 14 is electrically connected to the workpiece 6 through an ON-OFF switch 16 operated by an electric discharge control device 15. The electric discharge control device 15 varies a machining characteristic by controlling an ON-OFF time interval of a discharge current. Further, the device 15 electrically detects a short circuit caused in a space between the wire 20 and the workpiece 6, and supplies its detection signal to the CNC 2. Then, the CNC 2 supplies a command for canceling the short-circuited state to the machine 30 in accordance with the detection signal, and controls the movement of the X-Y table 5, thus relatively controlling the feeding operation of the wire 20. The particulars thereof will be described later.

A machining liquid processing unit 17 comprises a tank, filter, ion exchanger or the like, and the machining liquid is injected into a machining portion of the workpiece from an injection nozzle 18 attached to the unit. As mentioned above, the X-Y table 5 is moved by the servo motors 3 and 4 on the basis of control signals from the CNC 2, and the wire is fed while injecting the machining liquid from the injection nozzle 18, sequentially the pulse discharge is executed, thus the workpiece machined. When the pulse is discharged, the surface of the workpiece 6 is vaporized and fused, thereby permitting the workpiece 6 to form a desired shape.

Figure 3:
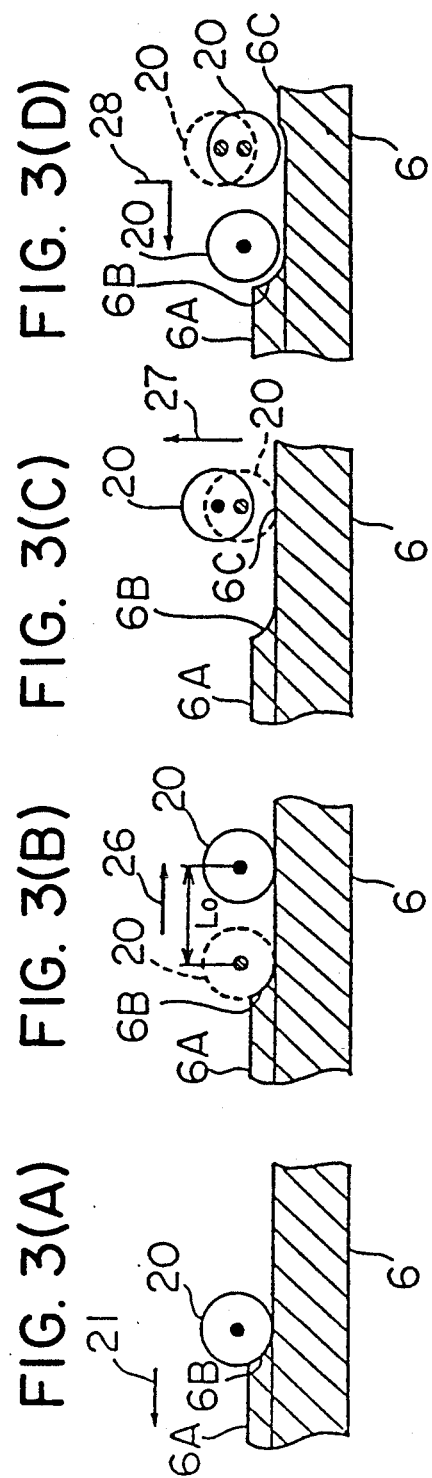
FIGS. 3(A), 3(B), 3(C), and 3(D) are views explaining the procedures of the method of canceling a short circuit in a wire cut electric discharge machine according to the present invention: in FIG. (A) shows a state in which a short circuit occurs, FIG. (B) shows a state in which the wire is reversed by the determined distance, FIG. (C) shows a state in which the optimum reversible control is carried out, and FIG. (D) shows a state in which the wire is returned to the spot where the short circuit initially occurred.

FIG. 3 is a view explaining the procedures of a method for canceling a short circuit generated in the wire cut electric discharge machine. FIG. (A) shows a state in which a short circuit occurs, FIG. (B) shows a state in which the wire 20 is reversed by a determined distance, FIG. shows a state in which the wire 20 is set to the optimum position by the reversible control, and FIGS. shows a state in which the wire 20 is returned to the spot where the short circuit initially occurred. Finishing allowance 6A of the workpiece 6 is ground by the discharge caused between the wire 20 and the workpiece 6, and are subjected to finish machining. As shown in FIG. 3(A), if a short circuit occurs between the wire 20 and the workpiece 6 in the advancing direction 21 of the wire 20, the electric discharge machining is interrupted at the short circuit detection spot 6B. When a short circuit is detected, the wire 20 is reversed by the determined distance $L_O$ as shown in FIG. 3(B).

This motion means that the wire 20 is reversed in the direction shown by an arrow 26 along the path previously machined. The short circuit generated in the advancing direction 21 of the wire 20 is surely canceled, however, a short circuit generated in the perpendicular direction to the advancing direction 21 is not yet canceled. As shown in FIG. 3(C), when the short circuit is not yet canceled at a spot 6c where the wire is reversed by the determined distance $L_O$ (the wire 20 is in a state shown by a broken line), the wire 20 is moved in the direction shown by the arrow 27 so as to be set to the optimum position by the reversible control. Thus, the short-circuited state (a short circuit in the perpendicular direction to the advanced direction) between the wire 20 and the workpiece 6 is surely canceled. In this case, the reversible control for setting the wire to the optimum position means a reversible control which is carried out in the case where a short circuit is not yet canceled at the time when the wire 20 is reversed with the determined distance. The optimum reversing direction (shown by the arrow 27) and distance of the wire 20 are determined in accordance with a machining profile of the workpiece 6 and a position of the wire 20 in machining, and the particulars thereof will be described later. Sequentially, when detecting the cancellation of the short circuit, as shown in FIG. 3(D), the wire 20 is moved in the direction shown by 28, and returned to the spot 6B where the short circuit initially occurred. Thus the electric discharge machining is restarted.

If the short circuit is not canceled at the time the wire 20 is reversed by the determined distance $L_O$ after a short circuit is detected, the reversing direction and distance of the wire in the foregoing optimum reversible control are determined in accordance with the situation whether or not the wire is placed on a corner in the machining profile at that time. The determining method thereof will be described below. Incidentally, concave and convex profiles shown later represent machining profiles.

Figure 4:
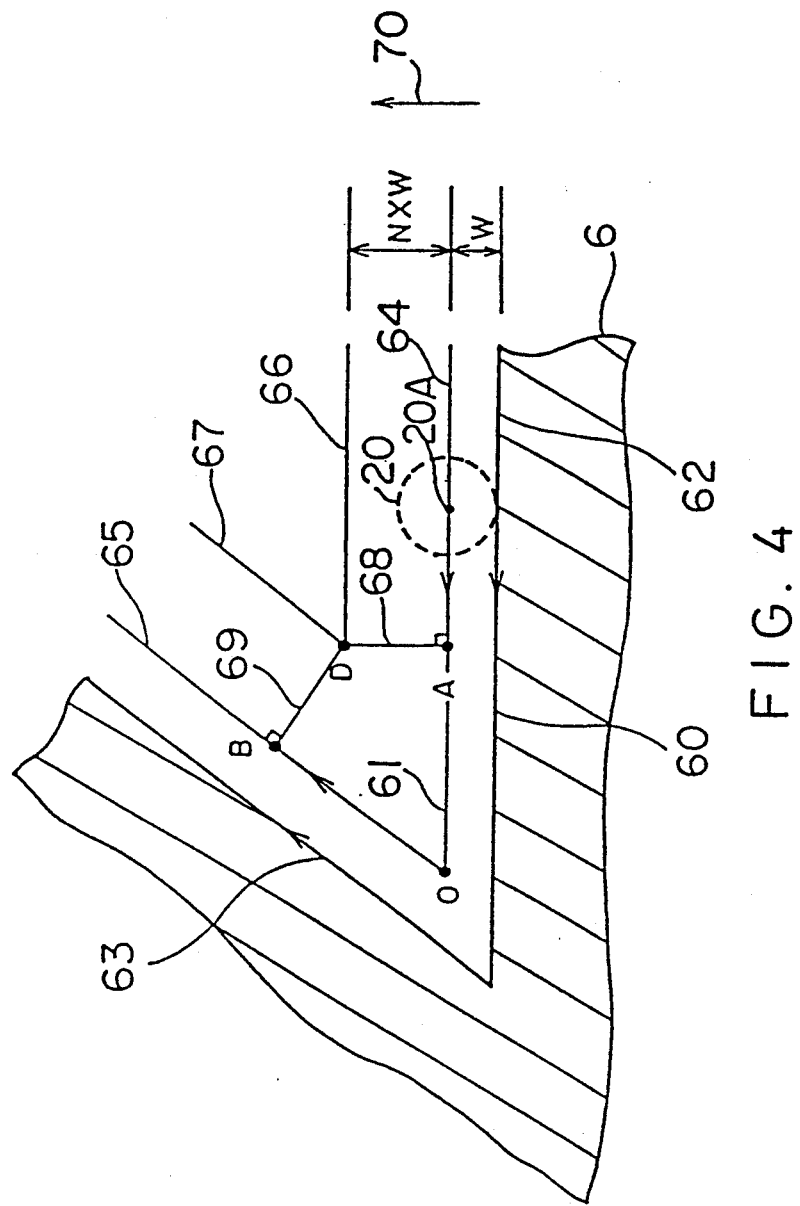
FIG. 4 is a view explaining how to determine the reversing direction and distance of the wire in the optimum reversible control, showing a state in which the wire is placed on the straight line or concave corner portion of the workpiece.

FIG. 4 is an explanatory view of the method of determining the reversing direction and distance of the wire in the optimum reversible control, and shows a case where the wire is placed on a straight line or concave corner portion of the workpiece. In this case, a concave corner portion 60 is subjected to the finish machining by means of the electric discharge machining. The concave corner portion 60 is formed pursuant to two move blocks, that is, two programmed paths 62 and 63 in the machining programs. Actually, the center point 20A of the wire 20 is moved along offset paths 64 and 65 formed by offsetting the programmed paths 62 and 63. The offset amount W is set in consideration of a radius of the wire 20 and other factors, or the like, and the center 20A of the wire 20 moves along the offset paths 64 and 65, thereby the electric discharge machining is performed. Furthermore, two assumed paths 66 and 67 are provided in parallel to the two offset paths 64 and 65. In other words, the assumed paths 66 and 67 are provided at a position of specified times (N time) as much as the offset amount W away from the programmed paths 62 and 63, respectively. Further, if normal lines 68 and 69 are drawn relative to the offset paths 64 and 65 from an assumed intersecting point D of the two assumed paths 66 and 67, intersecting points A and B of the normal lines 68 and 69 and the offset paths 64 and 65 are determined. A path (A-O-B) formed by connecting the intersecting points A and B and an intersecting point O of the two offset paths 64 and 65, is regarded as a concave corner portion 61.

Moreover, when the wire 20 is reversed by the determined distance after a short circuit is detected, the reversing direction and distance of the wire 20 in the optimum reversible control are determined in accordance with the situation whether or not the center point 20A of the wire 20 exists in the concave corner portion 61. Namely, if the center point 20A of the wire 20 does not exist in the concave corner portion 61, the reversing direction is set to the offset direction shown by an arrow 70, and the reversing distance (the maximum reversing distance of the wire 20) is set to N times as much as the offset amount W. While, if the center point 20A of the wire 20 exists in the concave corner portion 61, the reversing direction is directed toward the assumed intersecting point D, and the reversing distance is, therefore, equivalent to the distance from the center point to the assumed intersecting point D.

Figure 5:
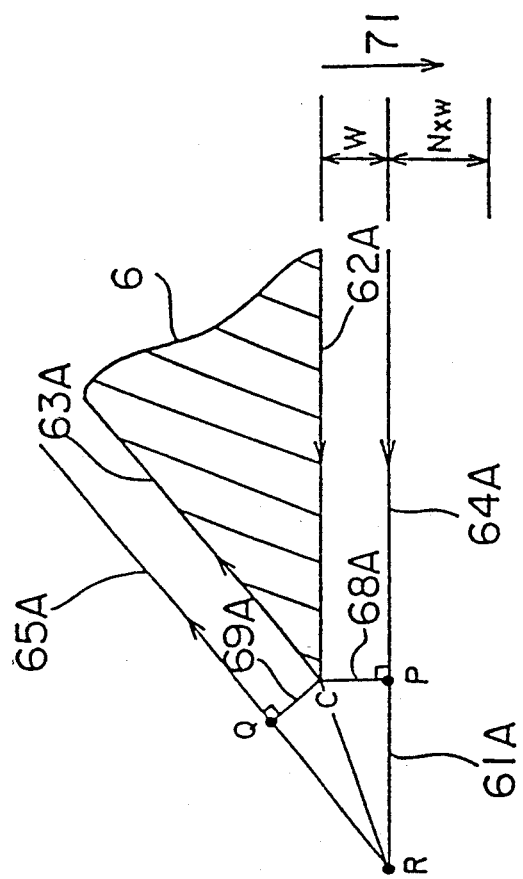
FIG. 5 is a view explaining how to determine the reversing direction and distance of the wire in the optimum reversible control, showing a state in which the wire is placed on the convex corner portion of the workpiece.

FIG. 5 is an explanatory view of the method for determining the reversing direction and distance of the wire in the optimum reversible control, and shows a state in which the wire exists in a convex corner portion. In the figure, the convex corner portion 61A is determined in the same manner as the concave corner portion 61, and the particulars thereof are as follows: Normal lines 68A and 69A are drawn from an intersecting point C of programmed paths 62A and 63A relative to offset paths 64A and 65A of the offset amount W, thus, intersecting points P and Q of the normal lines 68A and 69A and the offset paths 64A and 65A are determined. A path (P-R-Q) formed by connecting the intersecting points P and Q and an intersecting point R of the two offset paths 64A and 65A, is regarded as a convex corner portion 61A. If the center point 20A of the wire 20 exists in the convex corner portion 61A during the optimum reversible control, the reversing direction is set to the offset direction shown by an arrow 71, and the reversing distance is set to a distance of N time as much as the offset amount W.

Next, the reversing direction in accordance with the machining profile will be described later.

Figure 6:
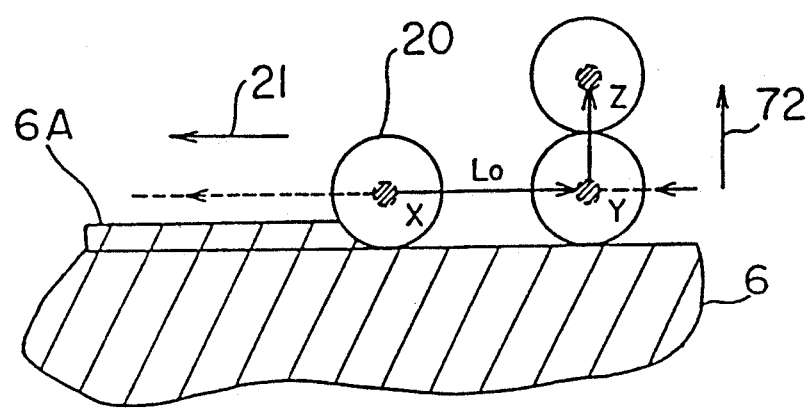
FIG. 6 is an explanatory view showing a state in which the wire is placed on the straight line portion of the workpiece.

FIG. 6 is an explanatory view showing a state in which the wire is placed on the straight line portion of the workpiece. If the wire 20 is short-circuited at the position X, the wire 20 is reversed along the machined path to the position Y with the determined distance $L_O$ away therefrom. At that time, the short circuit is not canceled there, so that the optimum reversible control is carried out, and in this case, since the wire 20 is placed on the straight portion of the workpiece, the reversing direction is directed to the offset direction 72. When the wire 20 is reversed to the offset direction 72 and the cancellation of the short circuit is detected at the position Z, the wire advances in the reversing direction and is returned to the position X where the short circuit occurred, thus the electric discharge machining being continued. Incidentally, in the case where the wire 20 is placed on the curved portion of the workpiece, the optimum reversible control is carried out in the same manner as it is placed on the straight portion, and at this time, the reversing direction is directed to the offset direction or the center direction of the curvature.

Figure 7:
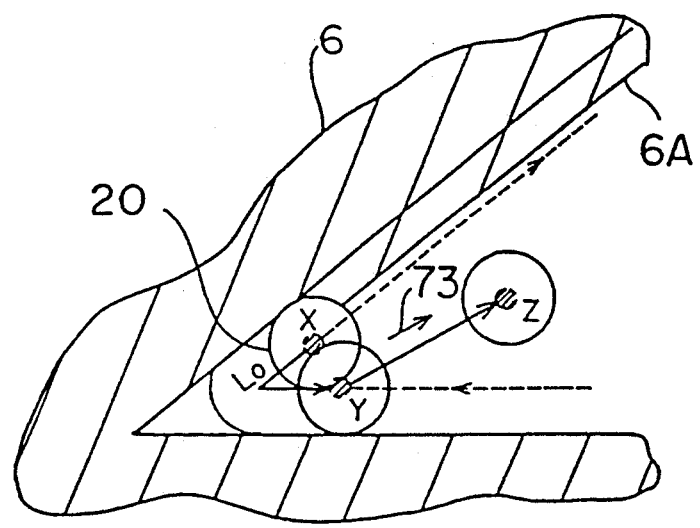
FIG. 7 is an explanatory view showing a state in which the wire is placed on the concave corner portion of the workpiece.

FIG. 7 is an explanatory view showing a state in which the wire is placed on the concave corner portion. If the wire 20 is short-circuited at the position X, the wire 20 is reversed to the position Y with the determined distance $L_O$ away at an acute sharpened angle. At that time, the short circuit is not yet canceled, so that the optimum reversible control is carried out, and in this case, since the wire 20 is placed on the concave corner portion, the reversing direction is directed to the assumed intersecting point direction 73. When the wire 20 is reversed to the assumed intersecting point direction 73 and the cancellation of the short circuit is detected at the position Z, the wire 20 advances in the reverse direction along the reversing path, and is returned to the position X where the short circuit occurred, thus the electric discharge machining being continued again.

Figure 8:
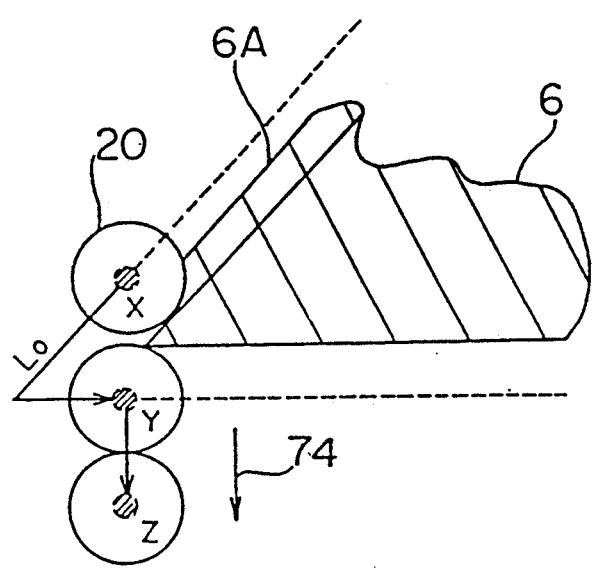
FIG. 8 is an explanatory view showing a state in which the wire is placed on the convex corner portion of the workpiece.
Figure 9A:
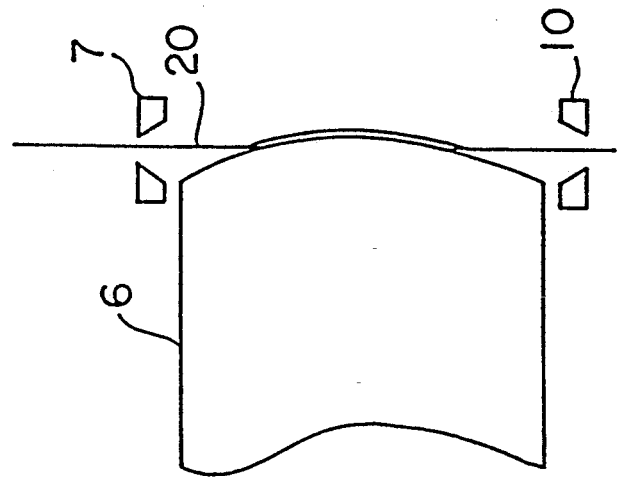
FIGS. 9(A) and 9(B) is a view showing a state between the wire and workpiece during the discharge machining; FIG. (A) shows a normal state, and FIG. (B) shows a short-circuited state.
Figure 9B:
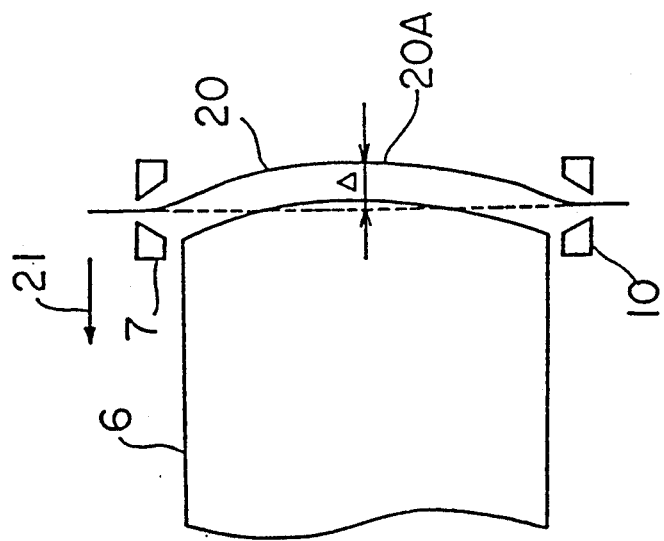
Figure 10:
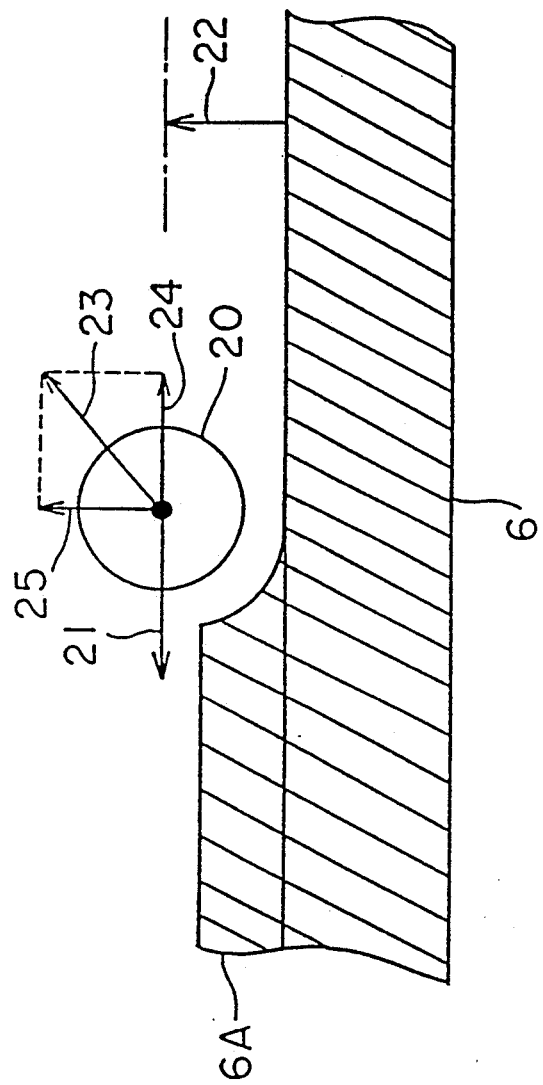
FIG. 10 is a view showing a state between the wire and the workpiece during the finish machining.

FIG. 8 is an explanatory view showing a state in which the wire 20 is placed on the convex corner portion. If the wire 20 is short-circuited at the position X, the wire 20 is reversed along the path previously machined to the position Y of the determined distance $L_O$ away therefrom. At that time, the short circuit is not yet canceled, so that the optimum reversible control is carried out, and in this case, since the wire 20 is placed on the convex corner portion, the reversing direction is directed to the offset direction 74. When the wire 20 is reversed to the offset direction 74 and the cancellation of the short circuit is detected at the position Z, the wire 20 is advanced in the reverse direction along the path previously reversed and is returned to the position X where the short circuit occurred in the same manner as mentioned in FIGS. 6 and 7, thus the electric discharge machining being continued.

As mentioned above, when the short circuit is detected, the wire is reversed along the path previously machined path by the determined distance, and if the short circuit is not yet canceled at that time when the wire is reversed by the determined distance $L_O$, the reversing direction and distance are determined on the basis of the wire position and machining profiles (straight line, concave and convex corners of the workpiece), thus there being provided a structure so that the reversible control for the wire 20 can be performed according to the determined reversing direction and distance. As mentioned above, the short circuit generated in not only the advancing direction of the wire 20 but also the perpendicular direction to the advancing one can be canceled. Accordingly, the short circuit generated in not only the advancing direction of the wire 20 but also the perpendicular direction to the advancing one can speedily and surely be canceled. Further, perfectly unmanned operation can be performed during rough to finish machining.

Figure 1:
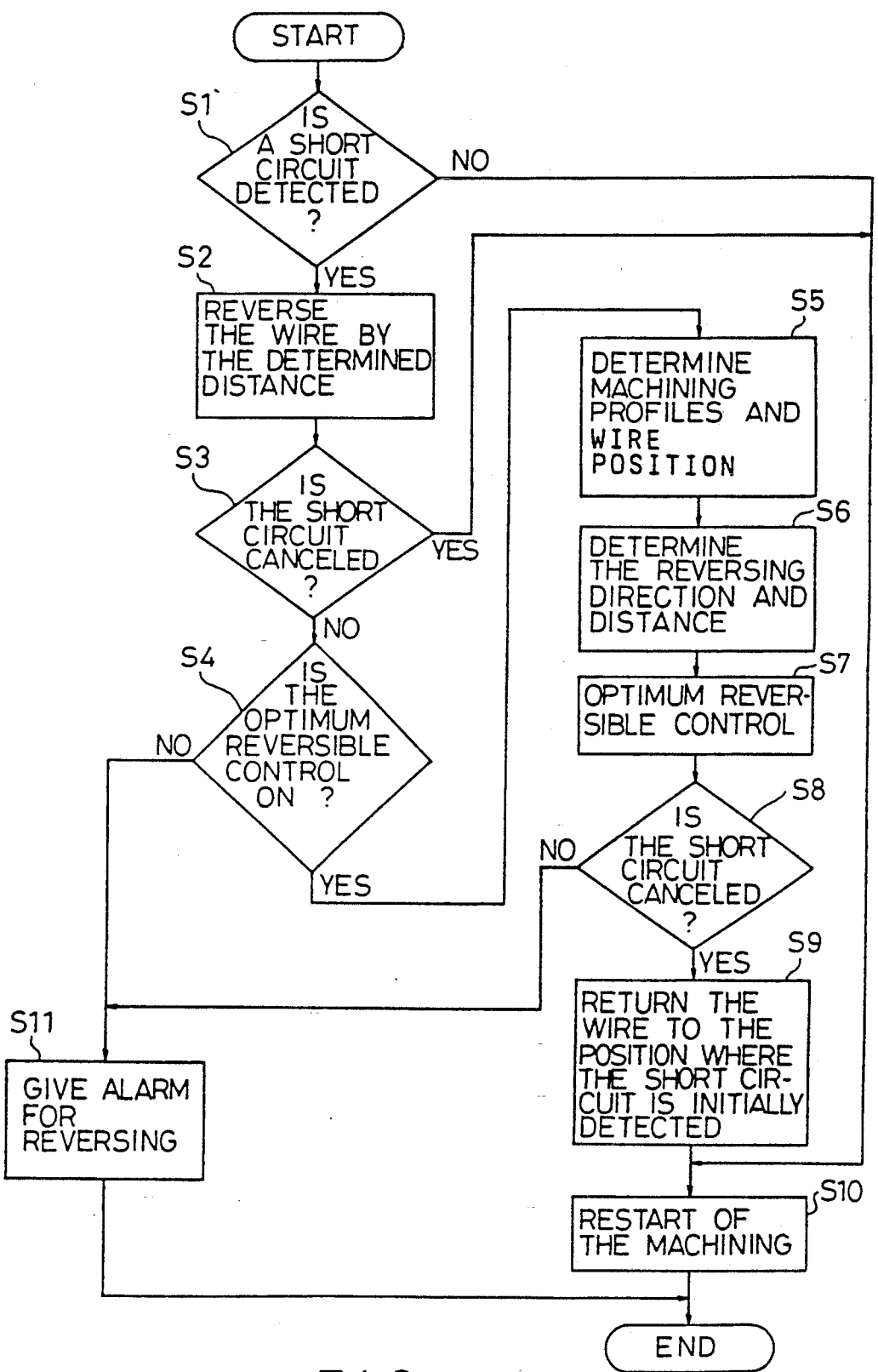
FIG. 1 is a flowchart showing the procedures for carrying out a method of canceling a short circuit in a wire cut electric discharge machine according to the present invention.

FIG. 1 is a flowchart explaining procedures for carrying out a method of releasing a short circuit in a wire cut electric discharge machine according to the present invention. In the figure, a numeral next to S denotes a step number.

[S1] It is decided whether or not a short circuit is detected. If it is detected, the sequence advances to S2, or if not detected, the sequence advances to S10.

[S2] The wire 20 is reversed by the determined distance $L_O$.

[S3] It is decided whether or not the short circuit is canceled at the time the wire 20 was reversed by the determined distance. If the short circuit is canceled, the sequence advances to S10, or if not canceled, it is determined that the short circuit occurs in the perpendicular direction to the advancing direction of the wire 20, the sequence advances to S4.

[S4] It is decided whether or not the optimum reversible control is ON. If it is ON, the sequence advances to S5, or if not, the sequence advances to S11.

[S5] Machining profiles (straight line, concave and convex corner portions) of the workpiece and wire position are determined.

[S6] The reversing direction and distance of the wire 20 are determined on the basis of the determined machining profiles and wire position.

[S7] The optimum reversible control of the wire 20 is carried out on the basis of the determined reversing direction and distance.

[S8] It is decided whether or not the cancellation of the short circuit is detected. If detected, the sequence advances to S9, or if not, the sequence advances to S11.

[S9] When the short-circuited state is canceled, the wire 20 is returned to the initial position where the short circuit is detected.

[S10] The electric discharge machining is again started.

[S11] When the optimum reversible control is not ON, or the cancellation of the short circuit is not detected even if the optimum reversible control is carried out, an alarm for reversing gives the operator the warning that the cancellation of the short circuit is not detected.

As seen from the above explanation, when the short circuit is detected, the wire is reversed along the path previously machined by the determined distance, and if the short circuit is not yet canceled at that time when the wire is reversed by the determined distance, the reversing direction and distance are determined on the basis of the wire position and machining profiles (straight line, concave and convex corners of the workpiece), thus there being provided a structure so that the reversible control for the wire can be performed pursuant to the determined reversing direction and distance. As mentioned above, the short circuit generated not only in the advancing direction of the wire but also in the perpendicular direction to the advancing one, can be canceled. Accordingly, the short circuit generated not only in the advancing direction of the wire but also in the perpendicular direction to the advancing one, can speedily and surely be canceled. Further, perfectly unmanned operation can be performed throughout rough to finish machining.

We claim:

1. A method of canceling a short circuit in a wire cut electric discharge machine, which cancels a short circuit generated between a wire and a workpiece during an electric discharge machining, the method comprising the steps of:

moving the wire in a reverse direction along a path previously machined by a first determined distance when a short circuit between the wire and the workpiece is detected;

performing a reversible control of the wire by moving the wire in a second direction and by a second distance determined based on machining profiles and a position of the wire moved in the reverse direction and located at the first determined distance, in order to cancel a short circuit in a direction perpendicular to a wire advancing direction;

advancing the wire along the path through which the wire is moved by the reversible control and the path previously machined, thereby returning the wire to the position where the short circuit is initially detected after the short circuit is canceled by the reversible control, and then continuing machining.

2. The method of canceling a short circuit in a wire cut electric discharge machine according to claim 1, wherein the performing step includes the step of determining the second direction and distance in accordance with whether or not the wire is placed on a corner portion of a machining profile.

3. The method of canceling a short circuit in a wire cut electric discharge machine according to claim 2, further comprising the step of forming the corner portion by connecting an intersecting point of two offset paths made by offsetting two programmed paths pursuant to two blocks of machining programs, and each of intersecting points of normal lines and two offset paths, the normal lines being drawn from assumed intersecting points of two assumed paths of specified times as much as the offset amount of the wire relative to the two programmed paths.

4. The method of canceling a short circuit in a wire cut electric discharge machine according to claim 2, further comprising the step of, when the wire position does not exist in the corner portion, directing the second direction in the wire offset direction, and making the second distance a distance of specified times as much as the offset amount of the wire.

5. The method of canceling a short circuit in a wire cut electric discharge machine according to claim 2, further comprising the step of, when the wire position exists in the corner portion and the corner portion is of a concave shape, directing the second direction from the wire position toward the assumed intersecting point of the two assumed paths made by offsetting specified times as much as the offset amount of the wire, and making the second distance a distance from the wire position to the assumed intersecting point.

6. The method of canceling a short circuit in a wire cut electric discharge machine according to claim 2, further comprising the step of, when the wire position exists in the corner portion and the corner portion is of a convex shape, directing the second direction in the wire offset direction, and making the second distance a distance of specified times as much as the offset amount of the wire.

7. The method of canceling a short circuit in a wire electric discharge machine according to claim 1, wherein the performing step includes the step of moving the wire in the second direction until a maximum distance becomes the determined second distance, and the step of completing the reversible control at the time when the cancellation of the short circuit is detected.

8. The method of cancelling a short circuit in a wire cut electric discharge machine according to claim 1, further comprising the step of performing the reversible control when the short circuit is not canceled at the time the wire is reversed by the first determined distance.

* * * * *

UNITED STATES PATENT AND TRADEMARK OFFICE
CERTIFICATE OF CORRECTION

PATENT NO. : 5,324,908
DATED : June 28, 1994
INVENTOR(S) : Teruo Masuda et al.

It is certified that error appears in the above-indentified patent and that said Letters Patent is hereby corrected as shown below:

Cover page, [57] Abstract, lines 9 and 10 of text, after "one" delete "sequentially" and insert --. Sequentially--.

Col. 3, line 25, delete "n".

Col. 4, line 47, after "workpiece" insert --is--;

line 56, after "FIG." insert --(C)--; and line 58, delete "FIGS." and insert --FIG. (D)--.

Col. 10, (claim 7) line 15, after "wire" insert --cut--.

Signed and Sealed this

Twentieth Day of September, 1994

Attest:

BRUCE LEHMAN

Attesting Officer

Commissioner of Patents and Trademarks